Jan. 6, 1970 E. F. W. PARROTT, JR 3,488,524

STROBE GATE APPARATUS WITH HIGH WINDOW-TO-STROBE PULSE WIDTH RATIO

Filed Oct. 18, 1966

INVENTOR

EUGENE F. W. PARROTT, JR.

BY

Braddock & Burd

ATTORNEYS

United States Patent Office 3,488,524
Patented Jan. 6, 1970

3,488,524
STROBE GATE APPARATUS WITH HIGH WINDOW-TO-STROBE PULSE WIDTH RATIO

Eugene F. W. Parrott, Jr., Burnsville, Minn., assignor to Fabri-Tek Incorporated, Minneapolis, Minn., a corporation of Wisconsin Filed Oct. 18, 1966, Ser. No. 587,587
Int. Cl. H03k 17/56
U.S. Cl. 307—254 17 Claims

ABSTRACT OF THE DISCLOSURE

Strobe gate apparatus having a pair of collector-coupled transistors with inputs connected to a source of signal input and to a source of strobe input. A source of interruptable bias is connected to normally bias the transistors off, and is connected to the outputs of the transistors so that an output pulse from the transistors will reverse the bias source for a predetermined period of time. The output is provided by concurrent application of signal input and strobe input.

Figure 1:
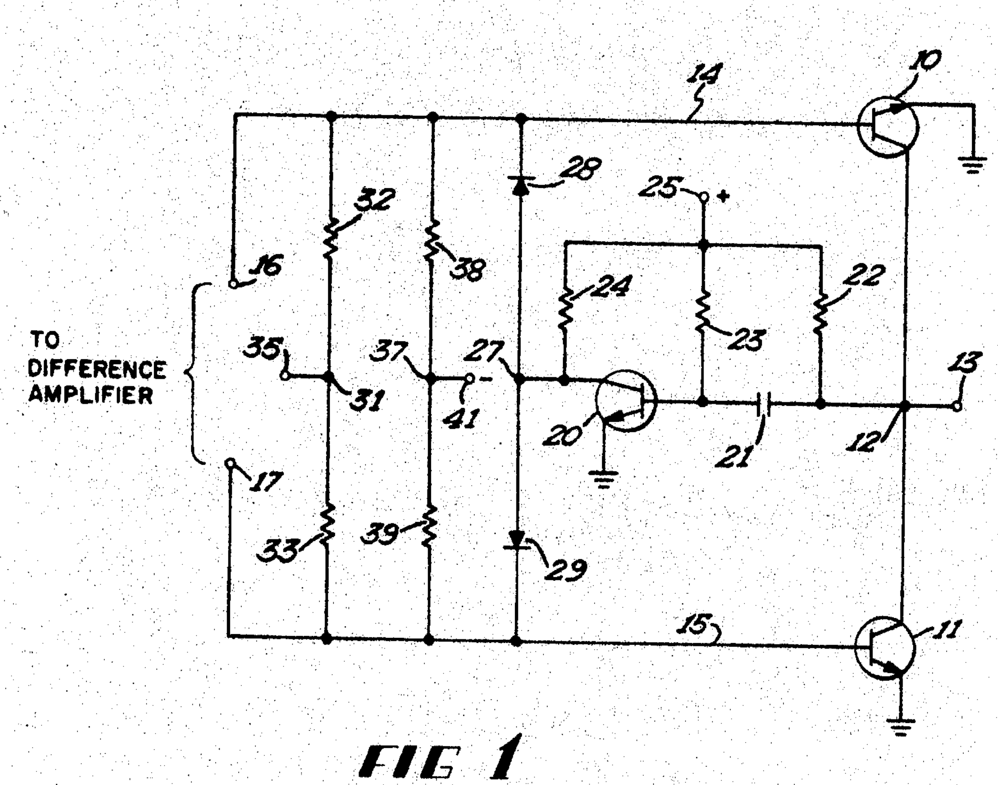

This invention is concerned with electronic gating apparatus, and more particularly with strobe gate apparatus adapted to provide a high window-to-strobe pulse width ratio for the readout of information stored in magnetic core memory systems.

In reading out information stored in some magnetic core memory systems it is necessary to "strobe" or sample the readout signal for a limited period of time determined by the system "window." The window can be defined as the time between the substantial cessation of the fastest switching "one" output, and the prior cessation of a combination of the latest "delta" noise and "zero" output, above the circuit threshold. This definition of window will be more fully described below in the discussion of FIGURE 2.

To provide the greatest system margins, the ratio of window-to-strobe pulse width should be high. As memory speeds become faster, however, the strobable windows become smaller. For example, for a 0.5 microsecond system, the window is typically 25–30 nanoseconds, and to maintain the system margins the actual strobe should be 10 nanoseconds or less. At the same time, however, the sampled output presented to the data register which is to store the readout information should be wide enough to reliably "set" the storage bistable unit; for the example above, this width is typically 20–30 nanoseconds. Prior art circuits designed to operate with such a brief active interval require highly critical and carefully designed components and wiring interconnections. The circuit for the strobe gate disclosed herein accomplishes the strobing of readout information better and faster than prior art systems without the highly critical component selection and wiring interconnection, and yet without permitting noise signals to appear in the output.

Briefly described, the apparatus of this invention comprises a pair of collector-coupled transistor switches or amplifiers. The input to each transistor is connected to a source of signal input, such as connecting each input to a different terminal across a difference amplifier. Each of the inputs to the transistors is also connected to a source of strobe pulses. There is also provided a source of interruptable bias, connected to the transistors to normally bias them off. The outputs of the transistors are connected to control the interruption of the bias, which interruption causes the bias to reverse. Concurrent application to an input signal and a strobe signal will turn on a selected one of the transistors, assuming the input signal is above a threshold set by threshold means connected to each of the transistors. Once turned on, the transistor output interrupts or reverses the bias to turn on the transistors for a predetermined period of time. Therefore, only the leading edge of the strobe signal need appear in the "window" of the input signal to operate the strobe gate, and the strobe gate output pulse width is determined by the period of interruption or reversal of the bias means to the transistors. Typically, a monostable multivibrator may be used in the interruptable bias source, the cycle of the monostable multivibrator substantially determining the width of the output signal. Such a cycle time should preferably be greater than the period of the strobe pulse to prevent a false turn-on of the strobe gate when the normal bias interruption is over.

Figure 2:
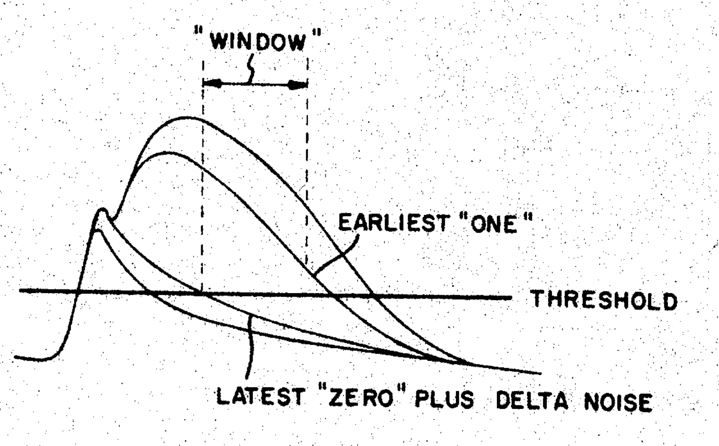

In the drawings:

FIGURE 1 is a schematic representation of one embodiment of the circuit of this invention; and FIGURE 2 is a graph from which a pictorial explanation of the definition of the "window" is seen.

Referring first to FIGURE 1 there are shown a pair of electrical switch means, here shown as a pair of collector-coupled transistors 10 and 11. The collectors of transistors 10 and 11 are each connected to a junction 12. Junction 12 is also connected to an output terminal 13. The emitters of transistors 10 and 11 are connected to a first polarity of a source of energy, here shown as ground. The base or input electrode of transistor 10 is connected through a line 14 to a signal input terminal 16. The base or input electrode of transistor 11 is connected through a line 15 to another signal input terminal 17. Terminals 16 and 17 are adapted to be connected to a source of signal input, such as across a difference amplifier. There is also shown a source of bias energy, including a transistor 20. Transistor 20 also has an emitter connected to ground. The base of transistor 20 is connected through a capacitor 21 to junction 12. The base of transistor 20 is also connected through a resistor 23 to a terminal 25 connected to another polarity on a source of energy, here shown as a source of positive current. Junction 12 is also connected to terminal 25 through a resistor 22. The collector of transistor 20 is connected through a resistor 24 to terminal 25, and is also connected to another junction 27. The junction 27 is connected through a diode 28 to the base of transistor 10, and is also connected through a diode 29 to the base of transistor 11. There is also shown a strobe input terminal 35 connected to a junction 31. Strobe input terminal is adapted to be connected to a source of strobe signal. Junction 31 is connected through a resistor 32 to the base of transistor 10, and is also connected through a resistor 33 to the base of transistor 11.

In the embodiment of FIGURE 1 there is also shown a threshold network, including a terminal 41 connected to a junction 37. Terminal 41 is connected to another polarity of a source of energy, as shown as a source of negative current. Junction 37 is connected through a resistor 38 to the base of transistor 10, and through a resistor 39 to the base of transistor 11.

Referring now to FIGURE 2, the definition of "window" can best be seen. For purposes of this analysis only, it is assumed that the "one" level is more positive than the "zero" level. Here it can be seen that the period of the window comprises the time between when the latest "zero" pulse, including "delta" noise, had approximately passed below the threshold level, to the point where the earliest "one" following the latest "zero" pulse has decayed to approximately the threshold level. With the window definition being apparent from this graphical presentation, it will also be apparent to one reasonably skilled in the art that as the speed of the system increases, the window must necessarily decrease. Thus the need for the present invention becomes apparent, in that the strobe pulse must be short and yet accurately within the window, and still result in a data readout pulse from the strobe gate sufficiently wide to affect the data register for storage. That is, the ratio of window-to-strobe pulse width must be kept high, which is accomplished in the apparatus of this invention as will be better understood following the description of the operation as follows.

Referring again to FIGURE 1, to best understand the operation of the apparatus of this invention, it should first be realized that bias current is provided from terminal 25, and controlled by the network including transistor, such that transistors 10 and 11 are normally biased off. That is, the bias energy is normally on. It will become apparent in the future discussion of the operation of the circuit that resistors 22 and 23, along with capacitor 21 and transistor 20 comprise elements which make up an interruptable bias source, in the form of a monostable multivibrator. When one of transistors 10 or 11 is turned on, the resulting output pulse will be felt through capacitor 21 on transistor 20 to turn off transistor 20 for a predetermined period of time, thus allowing transistors 10 and 11 to remain on for that period.

Referring to the operation in more detail, transistor 20 is normally on due to base current provided through resistor 23. The resulting current flow in collector resistor 24 divides between collector current in transistor 20, and forward current in diodes 28 and 29, which diode current also passes through, respectively, resistors 32 and 33 to strobe input terminal 35, which in this embodiment is normally held at a negative voltage. Because of this current flow, transistors 10 and 11 are biased off because of the slight back-bias on the base electrodes. It is preferred that the diode current in diodes 28 and 29 be greater than the dynamic range of the difference amplifier connected between signal input terminals 16 and 17, to prevent any signals on terminals 16 and 17 from reverse-biasing diodes 28 and 29. In this preferred embodiment of FIGURE 1, resistors 38 and 39, connected to a negative source of current at terminal 41, provide a threshold to aid in differentiation between a "zero" signal and a "one" signal.

When a strobe pulse appears at terminal 35, the input at terminal 35 is raised to approximately zero volts. This will cause the current that had previously flown through diodes 28 and 29 to be diverted to flow through the collector circuit of transistor 20. If at the same time the strobe appears, either of input terminals 16 or 17 has a positive input signal present (representing a "one"), the respective of transistors 10 or 11 will become forward-biased and turn on. The turn-on of either of transistors 10 or 11 will result in a reverse-bias of transistor 20, through capacitor 21, to turn transistor 20 off. The current which was flowing through resistor 24 and through the collector circuit of transistor 20 will now be diverted through diodes 28 and 29. This diode current then forward-biases transistors 10 and 11, maintaining them in an on condition during the cycle time of the monostable multivibrator including transistor 20. This cycle time is primarily determined by the pulse-forming time of the network comprising resistors 22 and 23 and capacitor 21. After a pulse time determined by the RC time constant of the last named network, transistor 20 will turn back on due to the charge on capacitor 21, and the forward biasing current through resistor 24 is again diverted back to the collector circuit of transistor 20, and transistors 10 and 11 become reverse-biased, to turn off.

It should be noted that the pulse-forming network comprising resistors 22 and 23 and capacitor 21 should preferably maintain transistor 20 in the off condition for a period longer than the width of the strobe input pulse, so that when transistor 20 again turns on, the strobe input level at terminal 35 is again at a negative level.

If at the time when the strobe input first appeared, no "one" input signal was present at either terminal 16 or 17 (which would indicate a "zero" in the difference amplifier), the threshold provided by resistors 38 and 39, connected to terminal 41, would prevent transistors 10 and 11 from turning on. Therefore, no output would appear at junction 12 to interrupt the bias which normally holds off transistors 10 and 11.

It will be apparent from the above that the pulse-forming or "latching" time of the minor circuit loop involving, for example, transistor 20, resistors 22, 23 and 24, capacitor 21, transistor 10 and diode 28, is what determines the "on" time of the strobe operation, being further dependent on the rise time of the leading edge of the strobe input pulse at terminal 35. That is, the readout signal is being strobed only during the time required to turn transistor 10 off (or transistor 11 in the opposite case). Thus, a comparatively wide strobe input pulse may be used, while the actual strobe time for a "one" may be quite narrow. As a result, the necessary high ratio of window-to-strobe pulse width is achieved, to provide good system margins. In addition, the data output pulse presented to a data register connected to output terminal 13 is substantially as wide as the pulse forming time of the network comprising resistors 22 and 23 and capacitor 21.

It will be apparent that the circuit shown and described herein is but a preferred embodiment of the apparatus of this invention, and that variations of this circuit may be made without departing from the scope of this invention.

The embodiments of the invention in which an exclusive property or privilege is claimed are defined as follows:

1. In an electronic strobe gate for sampling readout signals from a difference amplifier, the improvement comprising: a pair of collector-coupled transistors; a source of energy; a first polarity of said source connected to an emitter electrode on each of said transistors; means connecting base electrodes on each of said transistors to different outputs from the difference amplifier; means connecting said transistor collector electrodes to a second polarity of said source; monostable multivibrator means having a trigger terminal and an output terminal; means connecting said trigger terminal to said collector electrodes; diode means connecting said output terminal to each of said base electrodes; and strobe input means connected to said base electrodes.

2. The improved strobe gate of claim 1 including: threshold determining means connected between each of said base electrodes and a source of energy.

3. Electronic gate apparatus comprising: a pair of collector-coupled transistor amplifiers; a monostable multivibrator having an input connected to said collectors and an output connected to base electrodes on said pair of transistor amplifiers, said monostable multivibrator being normally on to bias off said transistor amplifiers; a strobe input terminal adapted to receive a strobe pulse; a pair of signal input terminals adapted to receive signal pulses; means connecting said strobe input terminal to said base electrodes; and means connecting each of said signal input terminals to one of said base electrodes, so that coincident application of a signal pulse to one of said signal input terminals and a strobe pulse to said strobe input terminal will turn on one of said transistor amplifiers to cause momentary turn-off of said monostable multivibrator, to momentarily bias on said transistor amplifiers.

4. The apparatus of claim 3 including means connected to each of said base electrodes for establishing a turn-on threshold.

5. Strobe gate apparatus comprising: a source of energy; electrical switch means including input, output and control electrodes; means connecting said input and output electrodes across said source of energy; bias means including momentary bias reverse means, said bias means connected to said control electrode to normally bias off said switch means and to bias on said switch means when reversed; signal input means; strobe input means; means connecting said signal input means and said strobe input means to said control electrode so that concurrent presence of a strobe pulse and a signal pulse will turn on said switch means; and means connecting said output electrode to said momentary interrupt means so that turn-on of said switch means reverses said bias means for a predetermined time period.

6. The apparatus of claim 5 in which said momentary bias reverse means includes means for making said predetermined time period longer than the time the strobe pulse is present.

7. The apparatus of claim 6 in which said momentary bias reverse means comprises a monostable multivibrator.

8. The apparatus of claim 5 including threshold bias means connected to said control electrode for setting a turn-on threshold for said switch means.

9. Strobe gate apparatus comprising: a source of energy; a pair of electrical switch means each including input, output, and control electrodes; means connecting said input and output electrodes across said source of energy; bias means connected to each of said control electrodes to normally bias off said switch means, said bias means including momentary bias reverse means; signal input means connected to each of said control electrodes for providing signal pulses thereto; strobe input means connected to each of said control electrodes for providing strobe pulses thereto, so that concurrent presence of a signal pulse and a strobe pulse on either of said control electrodes will turn on the respective of said switch means; and means connecting said output electrodes to said momentary bias reverse means so that turn-on of either of said switch means reverses said bias means for a predetermined time.

10. The apparatus of claim 9 in which said momentary bias reverse means includes a monostable multivibrator having a cycle time period longer than the time period of one of said strobe pulses.

11. The apparatus of claim 9 including threshold bias means connected to said control electrode for setting a turn-on threshold for each of said switch means.

12. Strobe gate apparatus comprising: a first semiconductor switch having first input, output and control electrodes; a second semiconductor switch having second input, output and control electrodes; a source of direct current; means connecting said first and second input electrodes to one polarity of said source; capacitance means connected between said first output electrode and said second control electrode; first and second resistance means connecting, respectively, said first output electrode and said second control electrode to another polarity of said source; third resistance means connecting said second output electrode to said another polarity of said source; means connecting said second output electrode to said first control electrode; signal input means connected to said first control electrode; and strobe input means connected to said first control electrode.

13. The apparatus of claim 12 including threshold means comprising: fourth resistance means connected between another source of direct current and said first control electrode.

14. The apparatus of claim 12 in which the network comprising said capacitance means and said first and second resistance means has an RC time constant greater than the duration of a strobe pulse from said strobe input means.

15. The apparatus of claim 12 including: a third semiconductor switch having third input, output and control electrodes; means connecting said third output electrode to said first output electrode; means connecting said third input electrode to said one polarity of said source; means connecting said third control electrode to said second output electrode and said strobe input means; and further signal input means connected to said third control electrode.

16. The apparatus of claim 15 including threshold means comprising: another source of direct current; and fourth and fifth resistance means connected between said another source and, respectively, said first and third control electrodes.

17. The apparatus of claim 15 in which the network comprising said capacitance means and said first and second resistance means has an RC time constant greater than the duration of a strobe pulse from said strobe input means.

References Cited

UNITED STATES PATENTS

| | | | |
|---|---|---|---|
| 2,840,726 | 6/1958 | Hamilton | 307—270 X |
| 3,053,995 | 9/1962 | Hallberg | 307—254 |
| 3,253,155 | 5/1966 | Randall | 307—235 X |
| 3,267,440 | 8/1966 | Piening et al. | 307—235 X |
| 3,287,574 | 11/1966 | Jenkins | 307—208 |

DONALD D. FORRER, Primary Examiner

U.S. Cl. X.R.

307—235, 243, 253, 273, 314